Patented Jan. 9, 1951

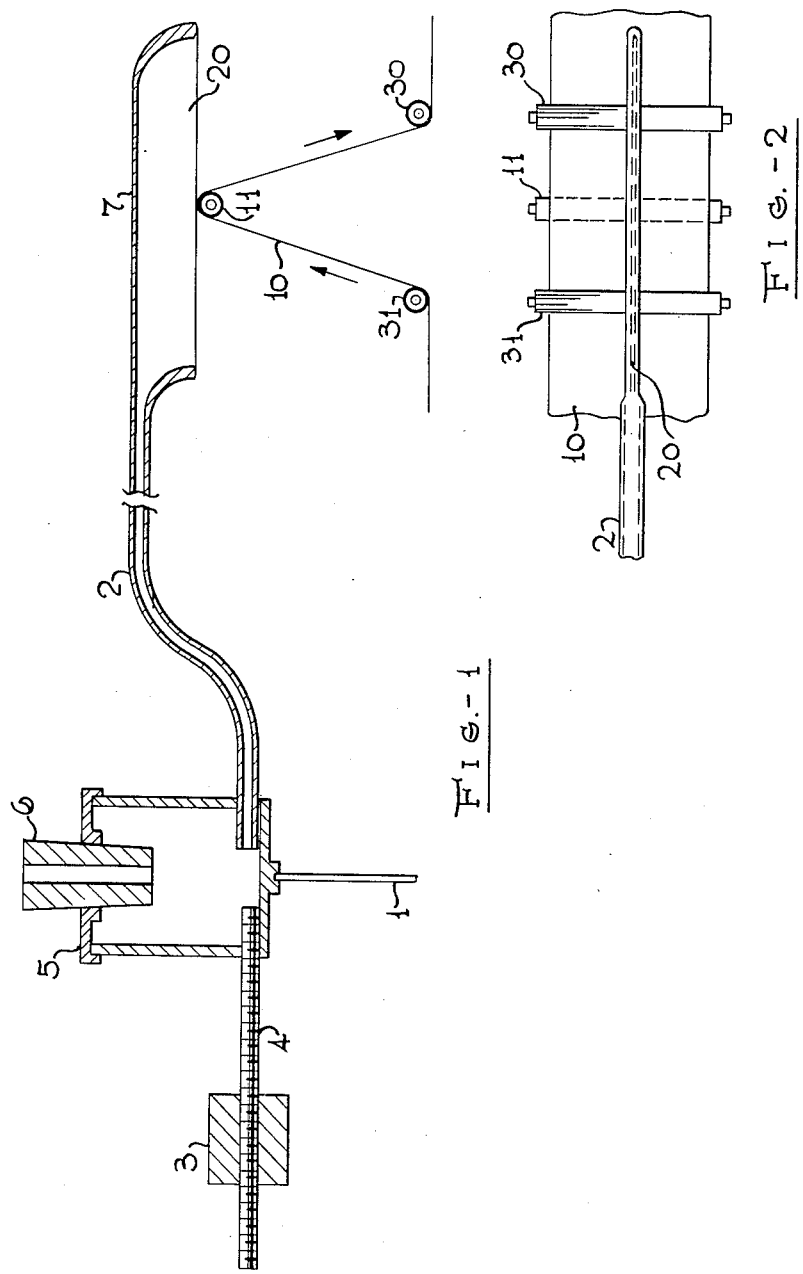

2,537,137

UNITED STATES PATENT OFFICE 2,537,137

RECTILINEAR PEN RECORDER

Alexander B. Hildebrandt, Tulsa, Okla., assignor to Standard Oil Development Company, a corporation of Delaware Application November 28, 1947, Serial No. 788,405

1 Claim. (Cl. 346—140)

The present invention is concerned with an improved instrument for recording electrical pulsations. The invention is specifically concerned with an improved rectilinear pen recorder for recording curvilinear motion as a rectilinear record. This result is secured by means of a specially designed pen comprising a relatively long inking slot which moves over the recording paper which is curved to present a tangential edge to the pen.

It is well known in the art to employ various types of recorders for recording electrical pulsations set up from a variation of primary impulses. For example, changes in pressure, changes in the flow of fluids and changes in electrical potential may be used as the primary impulses to activate a recording pen to make a continuous record of changes of the primary impulses. The methods used for converting the primary impulses to electrical pulsations which may be recorded are no part of the present invention. Therefore, no attempt will be made to describe these methods as they are well known to the prior art. The present invention is to be used with conventional recording equipment to achieve a rectilinear, rather than the conventional curvilinear record.

In accordance with my invention a recorder pen is employed having a long inking slot. This pen is caused to move in an arc by conventional means responsive to the application of variable primary impulses. The pen contacts the paper at a particular point of the slot determined by the particular angle or displacement in the arc at which the pen is momentarily positioned. The recording paper is sharply curved below the pen to present a substantially straight edge to the inking slot; consequently as the pen moves across the edge of the paper a substantially straight line will be recorded. It is to be understood that this invention is applicable to record the impulses or change of impulses received by any known method and actuated by any conventional operation.

My invention will be readily understood by referring to the drawings illustrating one embodiment of the invention. In the drawings Fig. 1 illustrates the entire instrument in an elevational cross-sectional view and Fig. 2 is a top view of the pen showing its relationship to the recording paper.

The recording pen is supported from a vertical rod 1. This rod is controlled, by means not shown, to rotate responsive to the application of primary impulses. Rotation of the rod 1 causes a rotation of the entire recording device moving the pen 7 in an arc. A well 5 is conveniently positioned directly above the rod 1. Recording ink is placed in the well 5 which is closed by a suitable plug 6. A counterweight 3 can be positioned at any point on rod 4 fixed to the inking well. By varying the position of counter-weight 3 suitable torque may be developed to substantially balance the weight of the recording pen. As shown, the recording pen 7 comprises a capillary tube 2 which is fixed in the inking well, having a flattened termination in which slot 20 is positioned. The pen may be conveniently constructed, as suggested, by flattening the capillary tube 2, cutting or filing away the lower part of it to provide an elongated slot. Alternately other methods may be employed to construct a slot of suitable characteristics. The recording paper 10 is carried below the pen on a small roller 11 so that effectively a single linear strip or edge of the recording paper is presented to the inking slot. The record paper may be rolled on the cylinder 30 which is driven by means not shown to pull the paper over cylinders 11 and 31 as desired. If it is assumed that the recording paper is stationary as the pen 7 is moved in an arc by virtue of the rotation of rod 1 the pen will be caused to move across the recording paper so as to utilize different portions of the elongated slot for ink delivery. Consequently the line drawn on the paper will be a straight line rather than a curved line. In actual operation the recording paper is not motionless but is moved over the roller 11 as indicated. However the speed of this paper is relatively slow while the movement of the pen responsive to primary impulses is generally relatively fast. Consequently, in actual operation substantially linear lines will be drawn as the pen moves in an arc across the paper. However, regardless of the relative speed of the paper and pen, the record produced is properly called a rectilinear record.

Th construction of the pen will be better understood by referring to Fig. 2. This figure shows a top view of the pen indicating the flattened appearance of the inking end 7 caused by suitably crushing the capillary tube 2. Fig. 2 also shows the relationship of the pen to the paper which is moved over the roller 11, making clear the manner in which a straight line is recorded on the paper, as the pen is moved through an arc.

My invention generally comprises providing a long narrow slot as the pen point. This slot is swung through an arc depending upon and controlled by impulses received from conventional recording operations. I pass the paper upwardly to contact the inking pen along the edge of a narrow roller and then withdraw the paper downwardly from said pen. The particular point of the pen which contacts the paper will be a direction function of the position of the recording arm in its arc which is a function of the impulses being received.

The dimensions of my pen may vary considerably, however, it is preferred that the internal diameter of the tube be in the range of about .03 to .05 inch. It is also preferred that the cylinder 11 have a diameter of about 1/32 of an inch and be not greater than 1/16 of an inch. In general it is preferred that the width of the slot be about .003 of an inch, falling in the range of .002 to .004 of an inch. The maximum width of the slot should not exceed about 1/32 of an inch.

It is to be understood that my invention may be considerably varied as desired. For example, instead of employing a roller over which the paper may be moved, it may be convenient to simply move the paper over the edge of a metal bar. Other equivalent means may be employed to accomplish the same purpose. It is my general concept that any means may be employed which is effective in substantially presenting a straight edge of the paper to the pen; in other words, to curve the paper so as to allow the pen to tangentially contact the paper. The appended claim is therefore to be given a broad interpretation commensurate with the contribution to the prior art.

Having now described my invention, I claim:

Improved apparatus for recording curvilinear motion as a rectilinear record on a moving recording paper which comprises a rotational supporting means adapted to rotate in response to the application of primary impulses representative of a quantity to be recorded, an elongated arm supported by said rotational means in a manner to effect movement of said arm in an arc upon rotation of said rotational means, said elongated arm comprising a capillary tube terminating in a portion flattened in a plane perpendicular to the plane defined by said arc, said flattened portion being cut open along its underside to form an elongated inking slot having a width less than the internal diameter of the unflattened portion of said capillary tube, a reservoir for recording fluid communicating with said capillary tube, and means for passing said recording paper past said inking slot so as to bring into contact with said slot at any one time only portions of said paper lying along a straight line essentially perpendicular to the line of motion of said paper.

ALEXANDER B. HILDEBRANDT.

REFERENCES CITED

The following references are of record in the file of this patent:

UNITED STATES PATENTS

| Number | Name | Date |
| --- | --- | --- |
| 1,820,088 | Parker et al. | Sept. 7, 1927 |
| 2,308,710 | Nichols | Jan. 19, 1943 |